Figure 1:
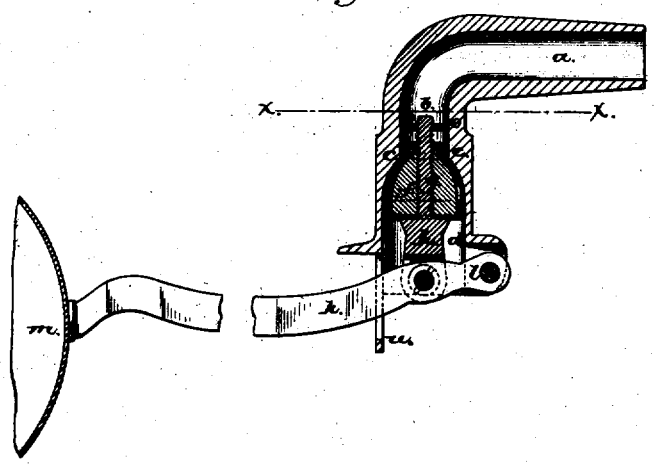

A. FULLER,

Assignor to H. C. Meyer & Co., & L. Wolff.

TANK-REGULATOR.

No. 7,801. Reissued July 17, 1877.

Witnesses:

Geo. H. Graham.

Jacob Fielbel

Inventor:

Albert Fuller by J. N. McPutre

Attorney.

N. PETERS, PHOTO-LITHOGRAPHER, WASHINGTON, D. C.

UNITED STATES PATENT OFFICE.

ALBERT FULLER, OF BROOKLYN, ASSIGNOR TO HENRY C. MEYER & CO., OF NEW YORK CITY, N. Y., AND L. WOLFF, OF CHICAGO, ILLINOIS.

IMPROVEMENT IN TANK-REGULATORS.

Specification forming part of Letters Patent No. 164,539, dated June 15, 1875; Reissue No. 7,801, dated July 17, 1877; application filed May 23, 1877.

*To all whom it may concern:*

Be it known that I, ALBERT FULLER, of Brooklyn, in the county of Kings and State of New York, have invented a new and useful Improvement in Tank-Regulators, of which the following is a full, clear, and exact description, reference being had to the accompanying drawings, making part of this specification.

Previous to my invention a contrivance has been employed for so regulating the supply of water to tanks and reservoirs that whenever the water should reach a certain height or level in the receptacle into which it was being discharged, the supply would be automatically cut off, and so that the water would be again automatically supplied whenever the level of the liquid in the tank should be lowered; and the usual contrivance employed for thus automatically regulating or controlling the supply of water to and in the tank or other reservoir has consisted in a suitable valve arranged to close upward and against the pressure of the water in the discharge-pipe, said valve having combined with it a lever hinged at one end to the lower part of the supply-nozzle, and provided at the other end with a float, the whole so arranged and operating (in a manner well known to those skilled in the art) that the closing and reopening of the valve would be automatically effected by the rise and fall of the lever-float on the surface of the water in the tank; but such tank-regulators have been found in practice to be very objectionable, on account of the noise and jar occasioned during the closing of the valve. This noisy action of the contrivance has been caused by the vibratory or tremulous movement of the valve laterally during its upward movement or passage to its seat in the supply-nozzle; and in cases where the head or pressure was considerable, the violent and noisy action of the valve device has rendered the use of the contrivance most objectionable.

The principle of construction of tank-regulators, as made prior to my invention, has been such that whenever the supply-column, with its usual fluctuations of head, was of considerable pressure and volume, the valve would necessarily rattle in coming to its seat, because, being supported at the lower end of its stem by a pivotal connection with the float-lever, and being forced upward to its seat by the impositive action of a lever actuated merely by a float, the effect of the water in its passage around and past the valve, while the latter was free to tumble or move laterally on its pivotal point of support, and the influence it exerted to keep the valve away from its seat, while the valve-closing lever was actuated only by the uncertain force of the float, tended necessarily to hold the valve in a state of agitation near its seat until the float should positively overcome this tendency, and during the time required to thus positively seat and hold the valve closed this rattle was inevitable.

I propose by my invention to overcome all this difficulty in a very simple and effectual manner, and provide a tank-regulator substantially like those heretofore made, but provided with means by which all noise and jar are prevented; and to this end and object my invention consists in the combination, with the valve, of means for holding and guiding laterally its stem, and insuring a central and positive motion of the valve toward its seat, as will be hereinafter more fully described.

To enable those skilled in the art to make and use my improved tank-regulator, I will now more fully explain its construction and operation, referring by letters to the accompanying drawings, in which—

Figure 2:
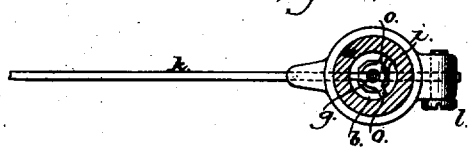

Figure 1 is a vertical section, and Fig. 2 a sectional plan (below the line *x x* at Fig. 1) of it.

*a* is that portion of the fixture which is, as usual, connected to the supply water-pipe, and which is extended downward at *b* (in a sort of L shape) to form the water-way, in which works the valve-stem, and the further extension of which, as at *d*, forms the valve-chamber. *k* is a lever, pivoted at *l*, (below the valve-chamber *d*,) provided with a float-ball, *m*, and guided between the bars at *u*, all about as usual, and *f* is the valve, by preference of rubber, properly secured by a clamping-nut, *i*, in the valve-stem *g*, the lower portion or base *h* of which is pivoted in the usual manner, and, as clearly shown, to the lever *k*. To the valve-stem *g*, near its upper end, is applied, as shown, a screw collar or washer, formed with three (more or less) arms, *o*, which radiate from the stem *g* sufficiently far to come into contact with the walls or sides of the water-way *b*, and which form guides to hold or steady the stem *g* laterally during its movement endwise within the passage *b*.

The general operation of the described contrivance is about like that of the tank-regulator heretofore made and used, the water passing from the supply-pipe through *a* and *b*, when the valve *f* is open, (or down from its seat,) and the supply being cut off by the closing of the valve as the float *m* rises, and causes the lever *k* to lift the valve; but, unlike the contrivances heretofore made and used, the one shown and described is provided with means (the arms *o*) by which the upper end of the valve-stem, or that end which is usually free to vibrate, is held or guided laterally, and effectually prevented from trembling as the valve comes toward its seat, so that no matter how great or fluctuating may be the pressure of the supply-column there can be no jar or rattle, and consequent noise, in the valve device of the apparatus.

Of course, in carrying out my invention, some other than the particular device shown of radiating arms *o*, working against the walls or interior of the water-way *b*, may be used to effect the guidance or retention, laterally, of the pivoted valve-stem, for the purpose of preventing the possibility of any vibration and noise, the gist of my invention resting in the use, in connection with the valve, of a suitable device or means for effecting the proper control, as described, of that end of the valve-stem which has heretofore been left free to vibrate about the point of pivotal connection of the valve-stem with the actuating float-lever.

What I claim as new, and desire to secure by Letters Patent, is—

In combination with the valve of a tank-regulator, pivoted at the lower part of its stem to the float-lever, and closing against the pressure of the supply-column, means for guiding or laterally holding the upper end of the stem of said valve, substantially as and for the purpose set forth.

In testimony whereof I have hereunto set my hand and seal.

ALBERT FULLER. [L. S.]

Witnesses:
F. A. DOYLE,
JACOB FELBEL.